S. N. Smith.
Steering.
N° 17,002 Patented Apr. 7, 1857.
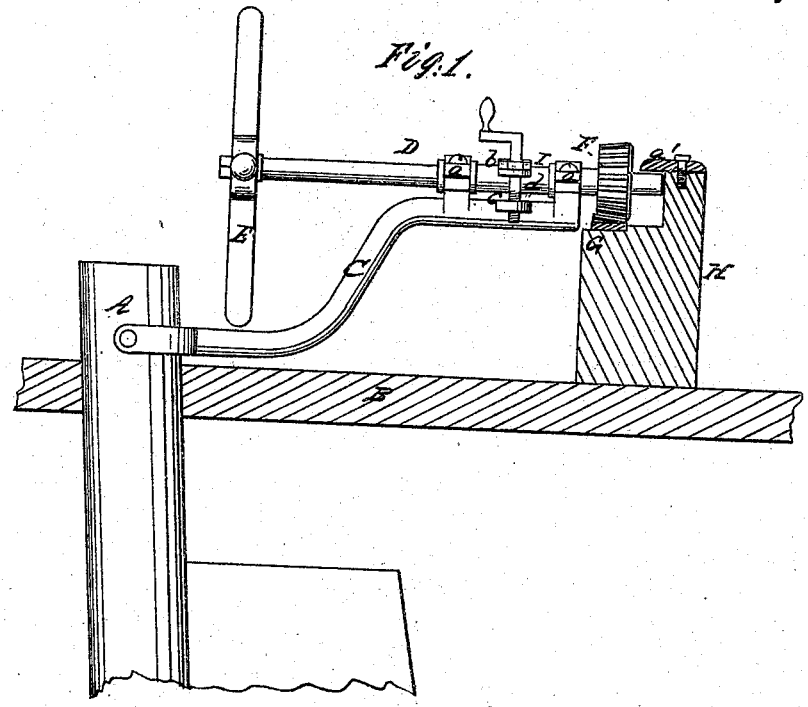
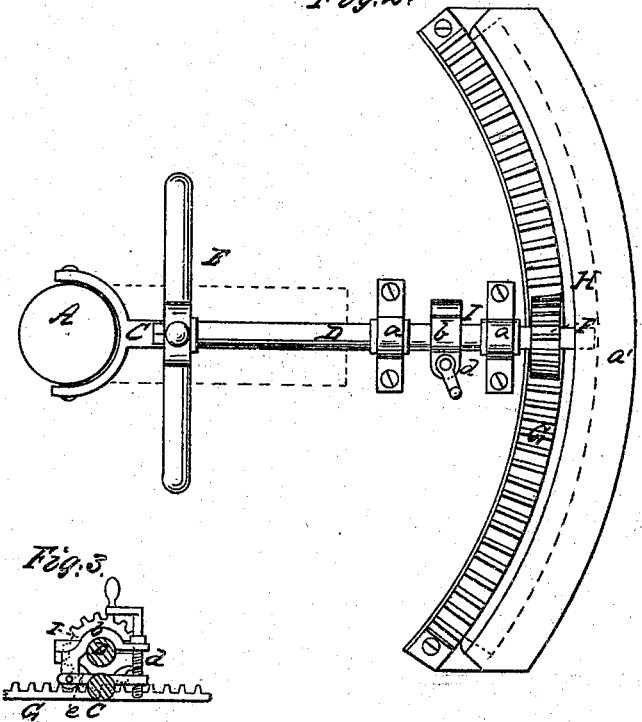
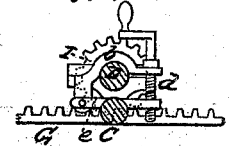

UNITED STATES PATENT OFFICE.

SAMUEL N. SMITH, OF NEW YORK, N. Y.

SHIP'S STEERING APPARATUS.

Specification of Letters Patent No. 17,002, dated April 7, 1857.

*To all whom it may concern:*

Be it known that I, SAMUEL N. SMITH, of the city, county, and State of New York, have invented a new and Improved Steering Apparatus or Device to be Applied to the Rudder-Heads of Vessels; and I do hereby declare that the following is a full, clear, and exact description of the same, reference being had to the annexed drawings, making a part of this specification, in which—

Figure 1, is a side view of my improvement. Fig. 2, is a plan or top view of ditto. Fig. 3 is a detached view of the brake.

Similar letters of reference indicate corresponding parts in the several figures.

This invention relates to that description of steering apparatuses in which the rudder is turned by means of a curved rack and pinion, the pinion being located upon the wheel shaft.

My improvement consists in having both the bearings of the wheel shaft located upon the tiller. Also in having a hand clasp located upon the tiller and wheel shafts.

To enable those skilled in the art to fully understand and construct my invention, I will proceed to describe it.

A represents the rudder head which passes up through the deck B of the vessel, and C is a tiller the inner end of which is forked and pivoted to the upper part of the rudderhead. The tiller may be constructed of an iron rod or bar bent or curved as shown in Fig. 1, so that its outer end will be sufficiently high to receive the shaft D of the wheel E. The shaft D works in suitable bearings (a) (a) attached to the tiller C. On the outer end of the shaft D, a pinion F is placed, and this pinion gears into a segment rack G, which is secured to a ledge H, the ledge being permanently attached to the deck B. The rack G is the portion of a circle of which the rudder head A, is the center. On the inner end of the shaft D, the wheel E, is placed. The ledge H has a flanch or cap (a') on is upper end and underneath which the outer end of the shaft D passes, said flanch or cap keeping the pinion F in gear with the rack.

I represents the brake, which is formed of a metal strap (b) having one end hinged or jointed to a bar (c) attached transversely to the tiller C. The opposite end of the bar (c) has a screw (d) passing through it. Said screw also passing through the end of the strap (b). The strap (b) is curved so as to correspond inversely with the cylindrical form of the shaft and thereby allow the strap to be forced tightly down upon said shaft by turning the screw (a), see more particularly Fig. 3.

From the above description of parts it will be seen that by turning the wheel E, the tiller C will be moved or operated either to the right or left, according to the direction in which the wheel E is turned, in consequence of the pinion F, gearing into the rack G, and it will also be seen that the tiller may be secured at any desired point, by turning the screw (a) of the brake I.

I am aware that in J. D. Crowell's patent, 1854, the steering is accomplished by means of a curved rack and pinion, and therefore I distinctly disclaim the invention of such device. But in the patent of said Crowell the front bearing of the wheel shaft is located upon the rudder head, which is objectionable because it renders the said bearing very insecure. When thus located the said bearing requires to be set in a swivel so that it will accommodate itself to the changes of position of the rudder head. The constant strain and jerking to which this bearing is subjected soon renders it loose, rickety and liable to break. But by curving up the tiller and locating both the bearings of the wheel shaft therefrom, as in my improvement, the shaft is held perfectly firm and secure at all times and no swivel is required. The expense of the swivel-joint alone is almost equivalent to the entire cost of my apparatus. By doing away with the swivel, my improvement renders the apparatus both safer and cheaper.

I do not claim to be the first inventor of brakes for stopping the steering wheel and holding it in any desired position. An example is seen in the rejected application of E. G. Otis, 1851, where the wheel is held by a strap which is connected with the deck of the vessel. This arrangement could not be used on my wheel because the wheel-shaft is constantly changing position, which is not the case in Otis' device. Having a hand brake upon the tiller and wheel shaft, as herein shown, is a new feature, to the best of my knowledge and belief.

What I claim as new, and desire to secure by Letters Patent, is:

Locating both of the bearings (a) of the wheel shaft D, upon the tiller C; I also claim locating the brake I (b) upon the tiller and wheel shafts C, D, all as described.

SAMUEL N. SMITH.

Witnesses:
W. TUSCH,
THOS. P. COOPER.